S. B. MARTIN.
ICE-MACHINE.

No. 173,314. Patented Feb. 8, 1876.

Witnesses.
C. W. M. Smith
Edw.d Barry

Inventor.
Sam.l B. Martin

UNITED STATES PATENT OFFICE.

SAMUEL B. MARTIN, OF SAN FRANCISCO, CALIFORNIA.

IMPROVEMENT IN ICE-MACHINES.

Specification forming part of Letters Patent No. 173,314, dated February 8, 1876; application filed May 21, 1874.

*To all whom it may concern:*

Be it known that I, SAMUEL B. MARTIN, of San Francisco, in the county of San Francisco and State of California, have invented an Improvement in Machines for the Manufacture of Ice and refrigerating purposes; and I do hereby declare that the following is a full, clear, and exact description of the same, reference being had to the accompanying drawings, and to the letters marked thereon.

This invention relates specially to the freezing or congealing apparatus of an ice-machine; and it consists mainly, first, in the peculiar means employed for freezing the water and forming the ice; and, second, in the peculiar means employed for detaching the ice, all of which will be fully described hereinafter.

Figure 1:
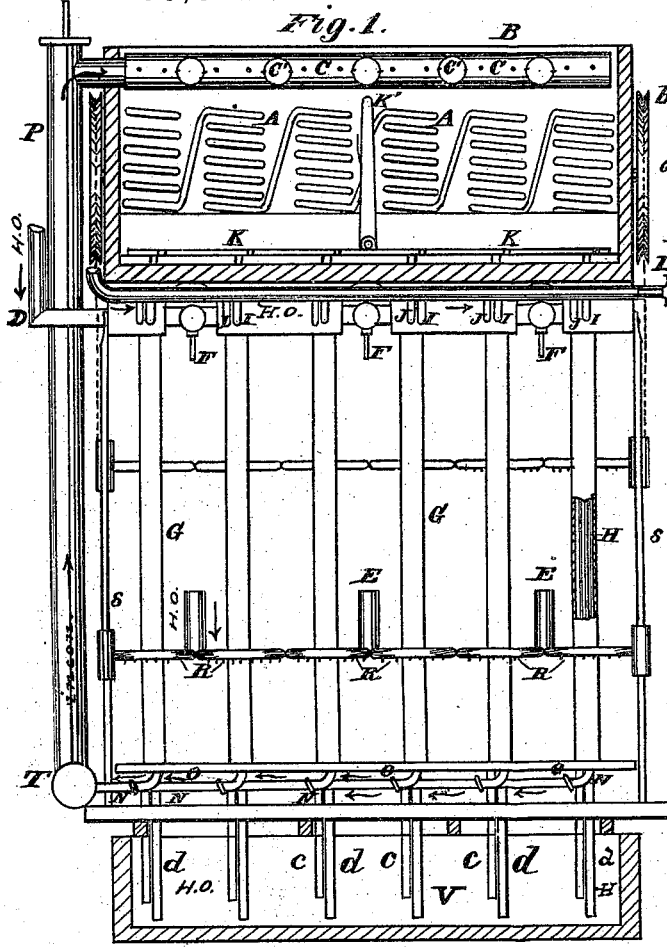
Figure 2:
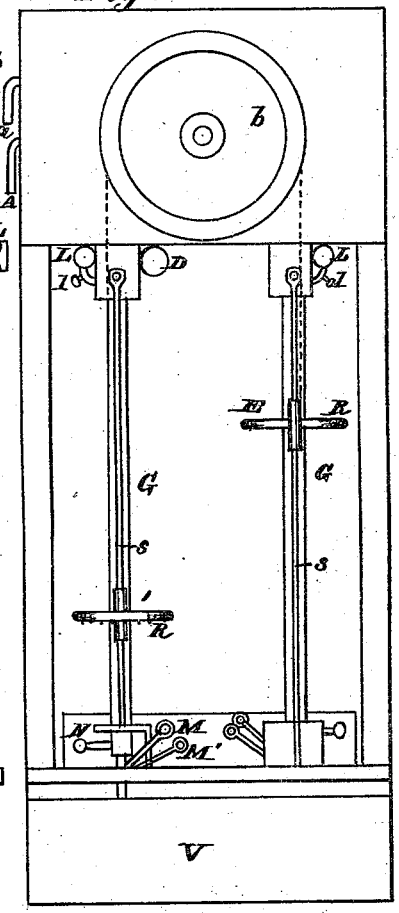
Figure 3:
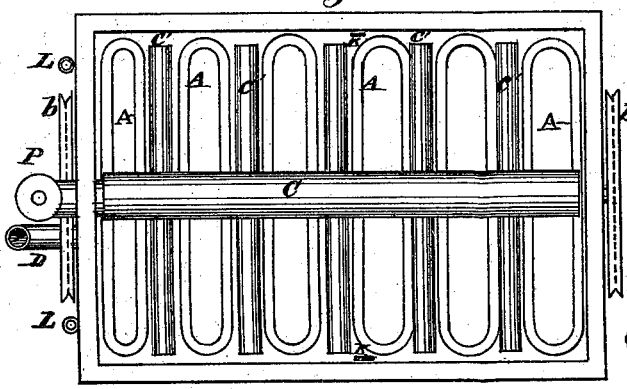
Figure 4:
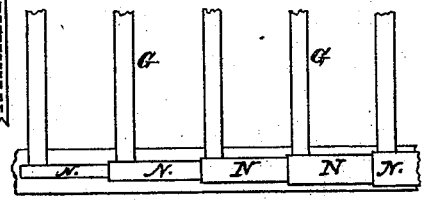

In the drawings, Figure 1 represents a side elevation of my improved apparatus, partially in section; Fig. 2, an end elevation; Fig. 3, a plan view, and Fig. 4 certain means employed to convey the incongealable liquid from the freezing-cylinder to the pump.

To enable others skilled in the art to make and use my invention, I will now proceed to describe fully its construction and manner of operation.

B represents the cooling-tank, located at the top of the machine, as shown, and A A suitable coils of pipe contained within the tank, and adapted to receive a suitable supply of volatile liquid from any proper source in the usual well-known manner. C represents a perforated main pipe extending over the tank in a longitudinal direction, and provided with a series of perforated transverse arms or branch pipes, C', upon each side, as shown. P represents a pump, the vertical cylinder of which is connected at the upper end with the pipe C, into which its contents are discharged, and at its lower end by a transverse pipe, T, and suitable branch pipes $o$ $o$, having proper regulating-cocks, to the vertical freezing cylinders or cores G. K represents a slide, operated by the central lever K', which is adapted to control a series of openings in the bottom of the tank B, communicating with the cylinders G, as shown.

By means of this construction of parts the incongealable liquid, when the pump is operated, is caused to circulate continuously through the freezing-cylinders, it being caused to pass from thence through the branch pipes $o$ $o$ and pipe T to the pump, and from thence through the perforated pipe C C' to the cooling-tank, and from it through the openings controlled by the slide K to the freezing-cylinders again. H represents a pipe, of suitable size, which is centrally located within the freezing cylinder or tube G, the relative diameter of each being such that the space between the outer surface of the interior pipe and the inner surface of the exterior pipe is small enough to spread the incongealable liquid moving through into a thin cylindrical sheet. The pipe is connected above by means of proper branch pipes, J, provided with cocks, with the main supply-pipe L communicating with a suitable reservoir at any proper point, and terminating below, as shown at $d$, Fig. 1, in a suitable tank, into which its contents may be discharged, when desired, by opening the lower cock M, Fig. 2. I I also represent branch pipes, controlled by proper cocks, by means of which communication is made, when desired, between the main pipe L and the intervening space between the cylinders G and pipe H, usually occupied by the incongealable liquid. $c$, Fig. 1, represents a discharge-pipe connected with this space, which is controlled by a proper cock, M', Fig. 2.

By means of this arrangement of parts water of a suitable temperature may be employed to detach the ice, either by admitting it to the interior of the inner pipe by means of the cocks I and discharge-cock M, or to the space intervening between the inner pipe and outer cylinder by means of the cock J and discharge-cock M'.

When the first plan is employed, the incongealable liquid in the intervening space is held at rest by closing the slide K in the tank B; or, if a single cylinder only is to be operated upon, by closing an independent cock adapted to shut off the supply of liquid to that cylinder, and also closing the cocks in the branch pipes $o$ $o$.

When the second plan is employed, the incongealable liquid is first withdrawn from the cylinder by shutting off the supply above in any proper manner, and permitting it to flow out below by the action of gravity and the pump, after which the cocks in the branch pipe $o$ are closed and the water admitted, as before described.

D represents a pipe, extending longitudinally beneath the bottom of tank B, one end of which is connected in any proper manner with a suitable reservoir of fresh water, and the other provided with a series of openings controlled by valves F, as shown, the latter being held to their seats, to close the openings, by gravity, and being opened by an upward movement. R represents a series of perforated rings, each one of which surrounds a freezing-cylinder, as shown, the members of each longitudinal series being united firmly together, and provided at each end with a socket adapted to slide vertically upon the rod S, Figs. 1 and 2. E represents a cup, one of which is located upon the connecting-line of each pair of rings, and is adapted to deliver water thereto.

Two series of rings are employed, one upon each side of the machine, as shown in Fig. 2, and the same are supported by means of a proper cord or chain at each end, passing over the pulley b, the two being so connected that by the depression of one the other is elevated, as indicated in Fig. 2.

The arrangement of parts is such that when one side is raised to its extreme elevation the valves F are lifted, and water thereby permitted to flow into the cups E, which descend after receiving a proper quantity, and discharge their contents in the form of spray upon the central cylinder. By the descent of one the other is raised in position to receive its supply, this ascent and descent being continued indefinitely.

From the foregoing description the operation will be readily understood. The volatile liquid is circulated through the coils A in tank B, in any proper manner. The incongealable liquid is sprayed upon the coils A in fine particles, and thus brought very intimately into contact with the cooling-pipes. This liquid, when reduced in temperature below the freezing-point, is admitted through the openings in the bottom of the tank, controlled by slide K, to the freezing-cylinder G, through which it passes in a thin cylindrical sheet, by which means all, or nearly all, its particles are brought into contact with the inner surface of the cylinder, and the heat more perfectly abstracted therefrom, after which it passes through branch pipes o and pipe T to the pump, by means of which it is again delivered to the tank in the form of spray.

The water to be frozen is delivered to the cups E, from which it is sprayed upon the freezing-cylinders as the cups descend, each side ascending and descending alternately, as hereinbefore described.

The ice is detached either by permitting water of a proper temperature to flow through the interior pipe H, the incongealable liquid being held in a state of rest in the space intervening between the pipe and cylinder, or by withdrawing entirely the incongealable liquid and permitting the water to flow through in its place.

Some marked advantages are obtained by the construction and arrangement of parts shown and described.

The vertical position of the freezing-cylinders permits the incongealable liquid to be employed in a sheet uniformly thin, by means of which the best effect is produced. By means of this position the incongealable liquid can be readily withdrawn if it is desired to use water in its place to detach the ice.

Having thus fully described my invention, what I claim as new, and desire to secure by Letters Patent, is—

1. As an improvement in the process of making ice which involves the employment of an incongealable fluid cooled by a volatile fluid or liquid applied within cylindrical freezing-pipes, I claim supplying said incongealable liquid to the freezing-plates in a thin cylindrical sheet, substantially as described.

2. A vertical freezing-cylinder, having an internal core for distributing the incongealable liquid within the cylinder in a thin cylindrical sheet, as described.

3. The combination of a vertical freezing-cylinder, an internal pipe to convey water, and means for controlling the supply of water, as described, the cylinder and pipe holding the contained liquid in a thin cylindrical sheet, for the purpose of rapidly communicating to the incongealable liquid the heat from the water, as described.

4. The combination of the freezing-cylinder, the internal pipe, the supply-pipe L, and the double system of cocks, to supply water either to the inner pipe or to the space intervening between the two, substantially as described.

5. The combination of a central core with a surrounding spraying apparatus moving vertically, substantially as described.

6. The combination of a vertically-moving spraying apparatus, a supply-pipe, and a trip-valve, substantially as described.

7. The combination of the independent series of spraying cups and rings, the connecting-chain, and supporting-pulley, substantially as described.

8. In an ice-machine, the combination of the vertical freezing-cylinder G, the connecting-pipes o T, pump P, and perforated spraying-pipes C C'.

9. The combination of the vertical freezing-cylinder pipes o T, pump P, perforated spraying-pipes C C', and valves F with a vertically-moving spraying apparatus.

10. The combination of the slide K and lever K' with the tank B, as and for the purpose described.

In witness whereof I have hereunto set my hand and seal.

SAML. B. MARTIN. [L. S.]

Witnesses:
E. V. SUTTER,
C. W. M. SMITH.